(12) United States Patent
Nyunoya et al.

(10) Patent No.: US 8,770,671 B2
(45) Date of Patent: Jul. 8, 2014

(54) AUTOMOTIVE WHEEL

(75) Inventors: Yoshiyuki Nyunoya, Aichi (JP); Shinji Yamada, Aichi (JP)

(73) Assignee: Central Motor Wheel Co., Ltd., Aichi (JP)

( * ) Notice: Subject to any disclaimer, the term of this patent is extended or adjusted under 35 U.S.C. 154(b) by 308 days.

(21) Appl. No.: 13/326,476

(22) Filed: Dec. 15, 2011

(65) Prior Publication Data
US 2012/0153708 A1 Jun. 21, 2012

(30) Foreign Application Priority Data

Dec. 17, 2010 (JP) ................................. 2010-281775

(51) Int. Cl.
*B60B 3/04* (2006.01)
(52) U.S. Cl.
USPC .................................. 301/63.107; 301/63.101
(58) Field of Classification Search
CPC .......... B60B 3/04; B60B 3/002; B60B 3/004; B60B 3/005; B60B 3/007
USPC ........ 301/63.101, 63.103, 63.107; 29/894.32, 29/894.322, 894.323, 894.325
See application file for complete search history.

(56) References Cited

U.S. PATENT DOCUMENTS

| 2,818,303 | A | * | 12/1957 | Main et al. | ................ | 301/63.104 |
| 2,840,422 | A | * | 6/1958 | Main et al. | ................ | 301/63.104 |
| 5,951,114 | A | * | 9/1999 | Marron et al. | ........... | 301/63.101 |
| 6,332,653 | B1 | * | 12/2001 | Shimizu et al. | ......... | 301/63.101 |
| 8,042,880 | B2 | * | 10/2011 | Kozaki et al. | ............ | 301/63.107 |

FOREIGN PATENT DOCUMENTS

JP        1-106701 A        4/1989

* cited by examiner

*Primary Examiner* — Kip T Kotter
(74) *Attorney, Agent, or Firm* — McDermott Will & Emery LLP

(57) ABSTRACT

An automotive wheel includes a wheel disc in which a hat section is provided outside a hub mounting section. A hat inner inclined surrounding section of the hat section includes an inner convex surrounding section protruding to a surface side in a curved shape, and an inner lower concave surrounding section continuously formed with an inner peripheral edge of the inner convex surrounding section, continuously formed with an outer peripheral edge of a hub surface rounded section, and protruding to the back side in a curved shape.

4 Claims, 6 Drawing Sheets

(A) PRIOR ART (B) PRIOR ART

AUTOMOTIVE WHEEL

CROSS-REFERENCE TO PRIOR APPLICATIONS

Priority is claimed to Japanese Patent Application. No. 2010-281775, filed on Dec. 17, 2010, which is hereby incorporated by reference in its entirety herein.

FIELD OF THE INVENTION

The present invention relates to an automotive wheel that is formed in one piece by joining a wheel disc connected to an axle and a wheel rim on which a tire is mounted.

BACKGROUND

As shown in FIG. 6 for example, a steel automotive wheel a of a two-piece type is known in which a generally disc-like wheel disc c is fitted inside a generally cylindrical wheel rim b and the wheel disc and the wheel rim are welded to each other to form one wheel. An example of the steel automotive wheel is proposed in JP-A-Hei 01-106701 ("JP '701"), for example. The wheel disc c includes a hub mounting section f that is coupled to a hub of an axle, a hat section h that is disposed on a back side of the hub mounting section f and protrudes to a surface side, and a disc flange d that is fitted inside the wheel rim b, which are circumferentially formed in a concentric pattern. The hub mounting section f and the hat section h is continuously formed through a hub surface rounded section j. The hat section h includes a hat top surrounding section p that protrudes to the surface side and a hat inner inclined surrounding section g that is continuously formed with the hat top surrounding section p and the hub surface rounded section j, which are circumferentially formed in a concentric pattern. A bulge section of the hat inner inclined surrounding section g includes an inner convex surrounding section k that protrudes to the surface side, which is circumferentially formed in a concentric pattern.

Because the wheel disc c of such the automotive wheel a can provide desired rigidity with the hat section h, the automotive wheel a has a high degree of effectiveness of preventing the deformation produced by various loads acting in the travel of the automobile and can provide high strength in general. Specifically, when the lateral acceleration is applied during the travel of the automobile, relatively large bending moment is acted so as to bend the wheel disc c in a front-and-back side direction. Because the hat section h can provide high rigidity to prevent the deformation against the bending moment, high strength can be provided, and also excellent driving stability can be provided.

The inner convex surrounding section k that is provided in the hat inner inclined surrounding section g of the hat section h is one of parts that are formed over a circumferential direction facing a surface-side angular edge of a brake caliper mounted on the vehicle body so as not to contact with the brake caliper when the automotive wheel a is mounted on the automobile.

SUMMARY

Currently, the automobile is strongly demanded to improve the environmental performance. Accordingly, the automotive wheel is severely required to have good performances such as high strength and high durability. Thus, the structure that includes the hat section as the structure of the related art described above (see FIG. 6) is also highly required to more improve the strength and the durability.

The present invention proposes an automotive wheel that can exhibit high strength and high durability.

Examples of the present invention are directed to an automotive wheel in which a wheel disc including a generally disc-shaped hub mounting section connected to a hub of an axle, a hub surface rounded section continuously formed with an outer peripheral edge of the hub mounting section and convexly curved in a back side, and a hat section continuously formed with an outer peripheral edge of the hub surface rounded section and protruding to a surface side is joined with a generally cylindrical wheel rim on which a tire is mounted, characterized in that the hat section includes a hat top surrounding section protruding to the surface side in a curved shaped over a circumferential direction and a hat inner inclined surrounding section continuously formed with an inner peripheral edge of the hat top surrounding section and continuously formed with the outer peripheral edge of the hub surface rounded section, and the hat inner inclined surrounding section includes: an inner convex surrounding section protruding to the surface side in the curved shape; and an inner lower concave surrounding section continuously formed with an inner peripheral edge of the inner convex surrounding section, continuously formed with the outer peripheral edge of the hub surface rounded section, and protruding to the back side in the curved shape.

When the automotive wheel according to the related art described above ("JP '701") is subjected to a rotating bending endurance test (JIS D4103) as the performance test, the wheel disc constituting the automotive wheel deforms, and the hub surface rounded section continuously formed with the outer peripheral edge of the hub mounting section may become the origin of fracture. In this rotating bending endurance test, bending moment (load) in the surface-side and back-side direction is applied to the automotive wheel, and therefore the test is equivalent to the situation where the aforementioned automobile is subjected to lateral force. Therefore, it can be said that the hub surface rounded section as the origin of fracture through this rotating bending endurance test exhibits greater burden of the stress due to the lateral force. The structure is demanded for reducing the burden of the stress on the hub surface rounded section. The inventors have found, as a result of intense studies to solve the above problems, that the burden of the stress acting on the hub surface rounded section in the rotating bending endurance test can be reduced by decreasing an inclination angle (see θ in FIG. 3) of the inner peripheral edge of the inner lower concave surrounding section which bends to the surface side and rises with respect to the hub mounting section (imaginary plane orthogonal to a central axis of the wheel disc).

The structure of the present examples can be made based on the above findings. Because the inclination angle (see θ in FIG. 3) of the inner peripheral edge of the inner lower concave surrounding section can be decreased by providing the inner lower concave surrounding section continuously formed with the hub surface rounded section and the inner convex surrounding section in the hat inner inclined surrounding section, the burden of the stress on the hub surface rounded section by the lateral force applied to the automobile can be reduced. The inner convex surrounding section in the hat inner inclined surrounding section is positioned so as not to contact with the brake caliper as described above. The geometry of the hub mounting section is determined in accordance with the hub of the axle. Accordingly, the positions of the inner and the outer peripheral edges of the inner lower concave surrounding section continuously formed through the hub surface rounded section are determined consequentially. Although the structure that has the constraint on the positions of the inner and the outer peripheral edges of the inner lower concave surrounding section is made as described above, because the form in which the inner lower concave surrounding section protrudes to the back side in the curved shape is made, the inclination angle (see θ in FIG. 3) of the inner peripheral edge of the inner lower concave surrounding section can be made small.

In the related art described above (for example, "JP '701"), the part continuously formed with the hub surface rounded section and the inner convex surrounding section has a form having a linear cross section or protruding to the surface side in the curved shape. In comparison with the related art described above, because the structure of the present invention has the inner lower concave surrounding section protruding to the back side in the curved shape and therefore the inclination angle (see θ in FIG. 3) of the inner peripheral edge of the inner lower concave surrounding section can be small, the functional effect of reducing the stress concentration on the hub surface rounded section can be achieved securely and stably.

According to the structure of the present invention, the stress concentration on the hub surface rounded section which is produced by the lateral force applied during the traveling of the automobile can be reduced, and therefore the durability withstanding the load (bending moment) acting by the lateral force can be improved. In general, the automotive wheel according to the present invention can provide high strength and high durability. In addition, according to the improvement of the strength, wall thickness of the wheel disc can be achieved to reduce the weight.

For the automotive wheel according to the present invention described above, the structure in which the inner lower concave surrounding section is formed such that the curvature thereof is smaller than the curvature of the hub surface rounded section is proposed.

According to such the structure, because the inner lower concave surrounding section and the hub surface rounded section can be formed in a balanced manner and the both sections can be continuously and smoothly formed, the effect of reducing the burden of the stress on the hub surface rounded section can be improved. Therefore, the functional effect of the present invention for reducing the stress concentration on the hub surface rounded section can be provided more appropriately.

When the curvature of the inner lower concave surrounding section is made larger than that of the hub surface rounded section, the protrusion of the inner lower concave surrounding section to the back side becomes large, and therefore a concern rises that the inner lower concave surrounding section contacts with the brake caliper. According to the structure of the present invention in which the curvature of the inner lower concave surrounding section is smaller than that of the hub surface rounded section, the structure can be easily formed so as not to contact with the brake caliper.

In the automotive wheel according to the present invention described above, the structure in which the inner lower concave surrounding section, the inner convex surrounding section, and the hub surface rounded section are respectively formed to have the following relation:

> Curvature of inner lower concave surrounding section<Curvature of inner convex surrounding section<Curvature of hub surface rounded section is proposed.

According to such the structure, because the inner lower concave surrounding section, the inner convex surrounding section, and the hub surface rounded section can be formed in a balanced manner and the section from the hub surface rounded section to the inner convex surrounding section can be smoothly formed, the effect of reducing the burden of the stress on the hub surface rounded section can be more improved. Accordingly, the functional effect of the present invention for reducing the stress concentration acting on the hub surface rounded section can be provided more appropriately.

For the automotive wheel according to the example described above, the structure in which the inner lower concave surrounding section has the radius of curvature of 25 mm or greater and 200 mm or smaller is proposed.

Such the structure includes the inner lower concave surrounding section having the radius of curvature of the above range, and therefore such the structure can stably provide the functional effect of reducing the stress concentration acting on the hub surface rounded section described above. Furthermore, the structure can be reliably formed so as not to contact with the brake caliper.

When the inner lower concave surrounding section has the radius of curvature larger than 200 mm, the effect of reducing the stress concentration acting on the hub surface rounded section by the lateral force applied to the automobile is small, and the aforementioned effect is likely limited in comparison with the related art described above (the structure in which a continuously formed part with the hub surface rounded section and the inner lower concave surrounding section has a linear cross section). In contrast, when the inner lower concave surrounding section has the radius of curvature smaller than 25 mm, a concern rises that the inner lower concave surrounding section contacts with the brake caliper.

The automotive wheel according to the examples is constructed such that the hat inner inclined surrounding section of the hat section includes an inner convex surrounding section protruding to the surface side in the curved shape, and an inner lower concave surrounding section continuously formed with the inner peripheral edge of the inner convex surrounding section, continuously formed with the outer peripheral edge of the hub surface rounded section, and protruding to the back side in the curved shape. Therefore, the automotive wheel can reduce the burden of the stress on the hub surface rounded section which is produced by the lateral force applied during the traveling of the automobile. Accordingly, because the stress concentration on the hub surface rounded section can be reduced, the automotive wheel can provide high strength and high durability. In addition, according to the improvement of the strength, wall thickness of the wheel disc can be achieved to reduce the weight.

When the automotive wheel according to the present examples has a structure in which the curvature of the inner lower concave surrounding section is formed to be smaller than the curvature of the hub surface rounded section, because the inner lower concave surrounding section and the hub surface rounded section can be formed in a balanced manner and the both sections can be continuously and smoothly formed, the functional effect of the present invention in which high strength and high durability are provided by reducing the stress concentration on the hub surface rounded section can be provided more appropriately. In addition, the inner lower concave surrounding section can be easily formed so as not to contact with the brake caliper.

When the automotive wheel according to the present example has a structure in which the inner lower concave surrounding section, the inner convex surrounding section, and the hub surface rounded section are respectively formed to have the relation of "Curvature of inner lower concave surrounding section<Curvature of inner convex surrounding section<Curvature of hub surface rounded section," because the inner lower concave surrounding section, the hub surface rounded section, and the inner convex surrounding section can be formed in a balanced manner and the section from the hub surface rounded section to the inner convex surrounding section can be smoothly formed, the functional effect of the present invention in which high strength and high durability are provided by reducing the stress concentration on the hub surface rounded section can be provided more appropriately.

When the automotive wheel according to the present example has a structure in which the inner lower concave surrounding section has the radius of curvature of 25 mm or greater and 200 mm or smaller, the functional effect of reducing the stress concentration acting on the hub surface rounded section described above can be provided stably. Furthermore, the inner lower concave surrounding section can be reliably formed so as not to contact with the brake caliper.

DETAILED DESCRIPTION

An automotive wheel 1 according to examples of the present invention will be described in detail with reference to the accompanying drawings.

Figure 1:
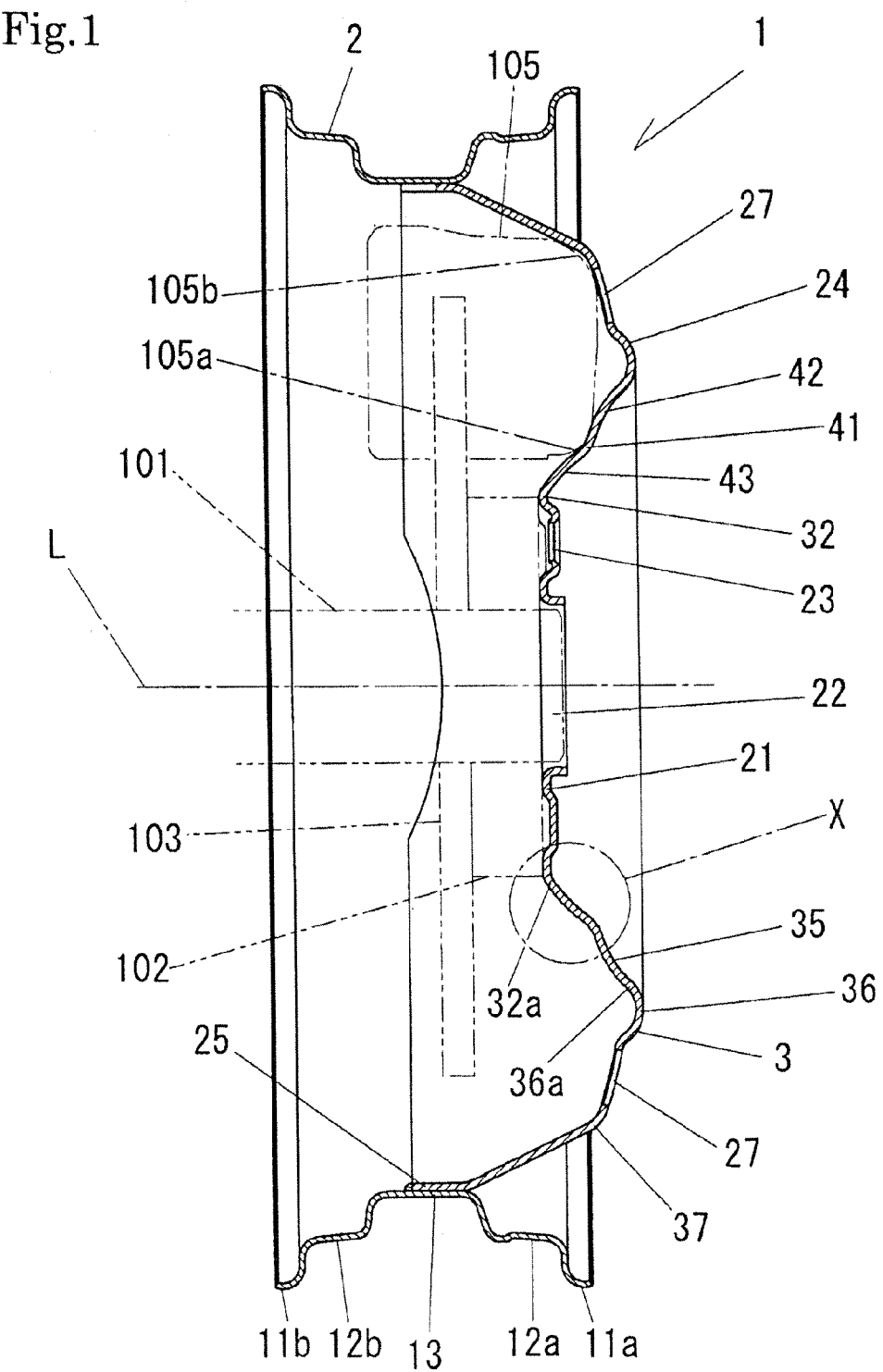
FIG. 1 is a vertical cross-sectional view of the automotive wheel 1 according to an example.
Figure 2:
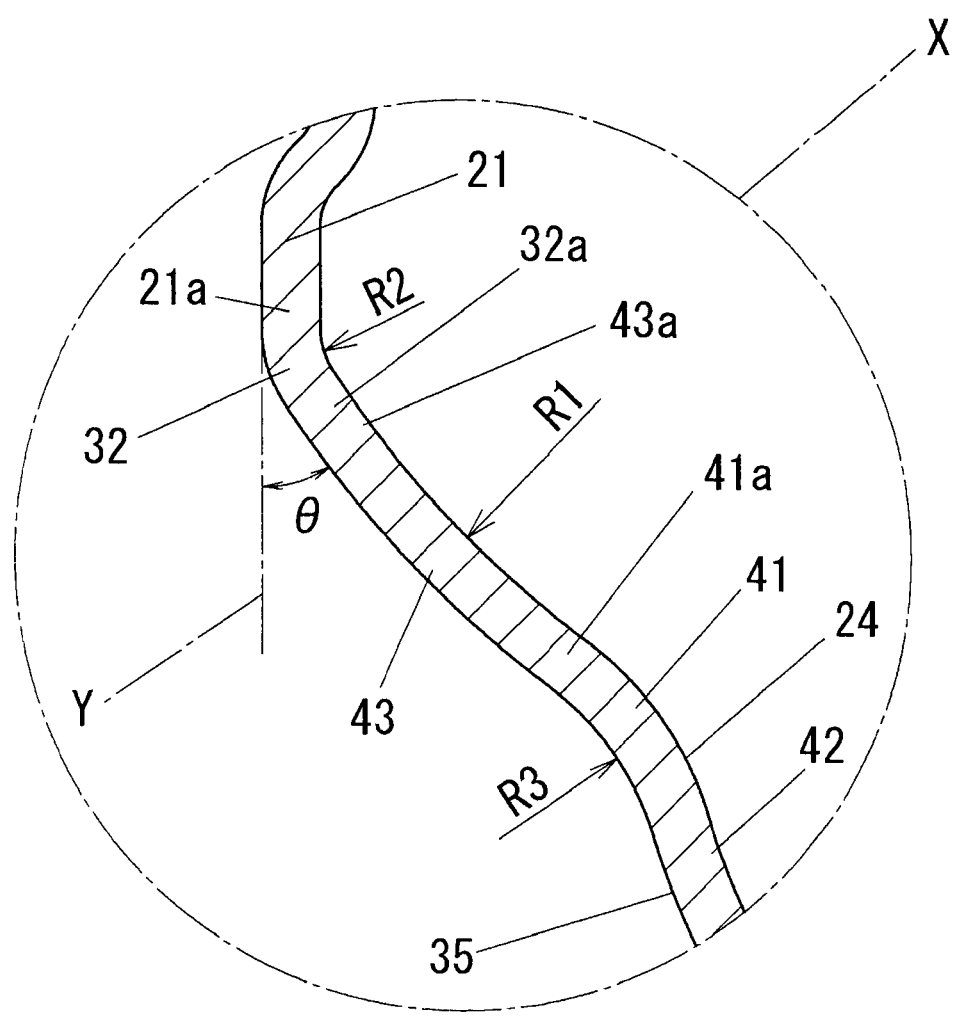
FIG. 2 is a vertical cross-sectional view showing a part X of FIG. 1 in an enlarged view.

FIG. 1 is a vertical cross-sectional view of the automotive wheel 1 according to an example, and FIG. 2 is a vertical cross-sectional view showing an inner section of the hat section 24 of the automotive wheel 1 in an enlarged view. The automotive wheel 1 has a so-called drop fitting type structure in which a disc flange section 25 of a wheel disc 3 is fitted inside a drop section 13 of a wheel rim 2, and the drop section 13 and the disc flange section 25 are fillet welded so as to integrate the wheel rim 2 with the wheel disc 3. The wheel rim 2 and the wheel disc 3 are each obtained by shaping a steel plate. The automotive wheel 1 according to the example is a two-piece type steel wheel.

In this example, a designing surface side of the wheel disc 3 is designated as a surface side, and a reverse side thereof is designated as a bade side. Meanwhile, the direction toward the central axis L of the automotive wheel 1 along the radial direction of the wheel is designated as an inward direction, and the opposite direction is designated as an outward direction.

The wheel rim 2 is shaped into a cylinder of non-circular cross section. The wheel rim 2 has rim flanges 11a, 11b respectively on a surface-side opening edge and a back-side opening edge of the wheel rim 2. The rim flanges 11a, 11b are designed to support respective side walls of a tire (not shown). The rim flange 11a is formed continuously with a surface-side bead seat 12a, while the rim flange 11b is formed continuously with a back-side bead seat 12b. The surface-side bead seat 12a and the back-side bead seat 12b are designed to allow respective beads of the tire to be seated. Furthermore, the drop section 13 protruding inward is provided between the surface-side bead seat 12a and the back-side bead seat 12b so that the tire can be mounted easily by dropping the beads of the tire into the drop section 13.

The wheel rim 2 is obtained by shaping a rectangular steel plate with predetermined dimensions. More specifically, the rectangular steel flat plate is rolled with its shorter sides butting against each other, and the shorter sides are butt-joined by upset butt welding to be formed into a cylinder body (not shown). The cylinder body is then subjected to rolling. In the rolling, specific inner and outer molds roll to press the cylinder body therebetween from the inside and the outside of the cylindrical body, thereby to form the cylinder body into the wheel rim 2 of a desired shape. The wheel rim 2 is formed from the rectangular steel flat plate by a conventionally known method. Therefore, the conventionally known method is not described any further.

In addition, the wheel disc 3 described above is generally in the shape of a disc. The wheel disc 3 includes a generally circular hub mounting section 21 having a hub hole 22 opening in its center, and an annular hat section 24 protruding to the surface side through the hub surface rounded section 32 continuously formed with the outer peripheral edge of the hub mounting section 21. The annular disc flange section 25 is disposed so as to extend from the outer peripheral edge of the hat section 24 to the back side. In the hub mounting portion 21, a plurality of bolt holes 23 each having a nut seat are formed by drilling around the hub hole 22 at equal intervals on the same circumference. A plurality of ornament holes 27 are formed in a hat outer inclined surrounding section 37 described below of the hat section 24 at equal intervals in a circumferential direction. The hub surface rounded section 32 is formed so as to rise from the outer peripheral edge of the hub mounting section 21 to the surface side in a curved manner, that is to say, formed in a curved manner to be recessed in the surface side.

The wheel disc 3 is formed by press work of a circular steel plate. More specifically, a generally square steel plate is formed into a saucer shape in which a circular dent is formed at the center, then the hub mounting section 21 and the hat section 24 are shaped by a drawing process, and the bolt holes 23 and the ornamental holes 27 are formed by a drilling process. Additionally, the saucer-shaped plate is subjected to restriking to form the disc flange section 25, thus to complete the forming of the wheel disc 3. These steps of forming the wheel disk 3 are performed in a conventional manner, and therefore the steps are not described any further.

The automotive wheel 1 in which the aforementioned wheel rim 2 is welded to the wheel disc 3 is mounted to an axle 101 of an automobile after a tire (not shown) is attached to the wheel 1. As shown in FIG. 1, the axle 101 includes a hub 102 that is pressed to the back side of the hub mounting section 21 of the wheel disc 3 and a disc-like brake disc 103. The hub 102 and the brake disc 103 are secured to the axle 101 and rotates together with the axle 101. A brake caliper 105 for applying the brake disc 103 is disposed on the body side of the automobile.

The automotive wheel 1 is pressed and secured to the hub 102 by insertion of a plurality of bolts (not shown) that protrude from the hub 102 of the axle 101 into the bolt holes 23 of the hub mounting section 21 and threaded engagement of each bolt with a nut (not shown). In the condition that the automotive wheel 1 is secured to the axle 101 as described above, the brake disc 103 and the brake caliper 105 described above are disposed in an inner space of the automotive wheel 1. Therefore, the geometry of the wheel disc 3 of the automotive wheel 1 is designed so as not to contact with the brake caliper 105. The brake caliper 105 has a three-dimensional shape that includes therein brake pads pressed against the brake disc 103. In the example entitled Embodiment 1 herein, the brake caliper 105 is adapted to have the three-dimensional shape with a specified length in a generally circumferential direction. The brake caliper 105 has a shape that includes surface-side angular edges 105a and 105b along the circumferential direction respectively in an inner side and an outer side in the radial direction.

As shown in FIGS. 1 and 2, the hat section 24 of the wheel disc 3 includes a hat top surrounding section 36 that most protrudes to the surface side in a curved shape, a hat inner inclined surrounding section 35 that is disposed between the hat top surrounding section 36 and the aforementioned hub surface rounded section 32, and a hat outer inclined surrounding section 37 that is disposed between the hat top surrounding section 36 and the disc flange 25. The hat top surrounding section 36, the disc flange 25, the hub surface rounded section 32, and the hub mounting section 21 are formed concentrically about the central axis L. The hub surface rounded section 32 is continuously formed with the outer peripheral edge 21a of the hub mounting section 21.

The hat inner inclined surrounding section 35 is continuously formed with the outer peripheral edge 32a of the hub surface rounded section 32 and then continuously formed with the inner peripheral edge 36a of the hat top surrounding section 36. An inner convex surrounding section 41 protruding to the surface side in a curved shape is disposed in the bulge section of the hat inner inclined surrounding section 35. An inner upper concave surrounding section 42 that is continuously formed with the outer peripheral edge of the inner convex surrounding section 41 as well as the inner peripheral edge 36a of the hat top surrounding section 36 is circumferentially formed so as to protrude to the back side in the curved shape. In addition, an inner lower concave surrounding section 43 that is continuously formed with the outer peripheral edge 32a of the hub surface rounded section 32 as well as the inner peripheral edge 41a of the inner convex surrounding section 41 is circumferentially formed between the inner convex surrounding section 41 and the hub surface rounded section 32 so as to protrude to the back side in the curved shape. The inner convex surrounding section 41, the inner upper concave surrounding section 42, and the inner lower concave surrounding section 43 are formed concentrically about the central axis L with the hub surface rounded section 32 and the hat top surrounding section 36.

The geometries of the hat inner inclined surrounding section 35 and the hat outer inclined surrounding section 37 are respectively determined so as not to contact with the brake caliper 105 in the state that the automotive wheel 1 is connected to the axle 101. Specifically, the hat inner inclined surrounding section 35 is formed to protrude to the surface side in the curved shape through the determination of the positions in the radial direction and in the front-and-back side direction such that the inner convex surrounding section 41 faces to and does not contact with the surface-side angular edges 105a of the brake caliper 105. An outer diameter of the hub mounting section 21 is determined on the basis of the hub 102 of the axle 101, and the position of the hub mounting section 21 in the front-and-back side direction is determined according to the setting of an inset. As described above, because disposing positions of the hub mounting section 21 and the inner convex surrounding section 41 are respectively determined, an inner peripheral edge position of the hub surface rounded section 32 (the position of the outer peripheral edge 21a of the hub mounting section 21) and an outer peripheral edge position of the hat inner lower concave surrounding section 43 that is continuously formed with the inner convex surrounding section 41 through the hub surface rounded section 32 (the position of the inner peripheral edge 41a of the inner convex surrounding section 41) are determined consequentially.

Figure 3:
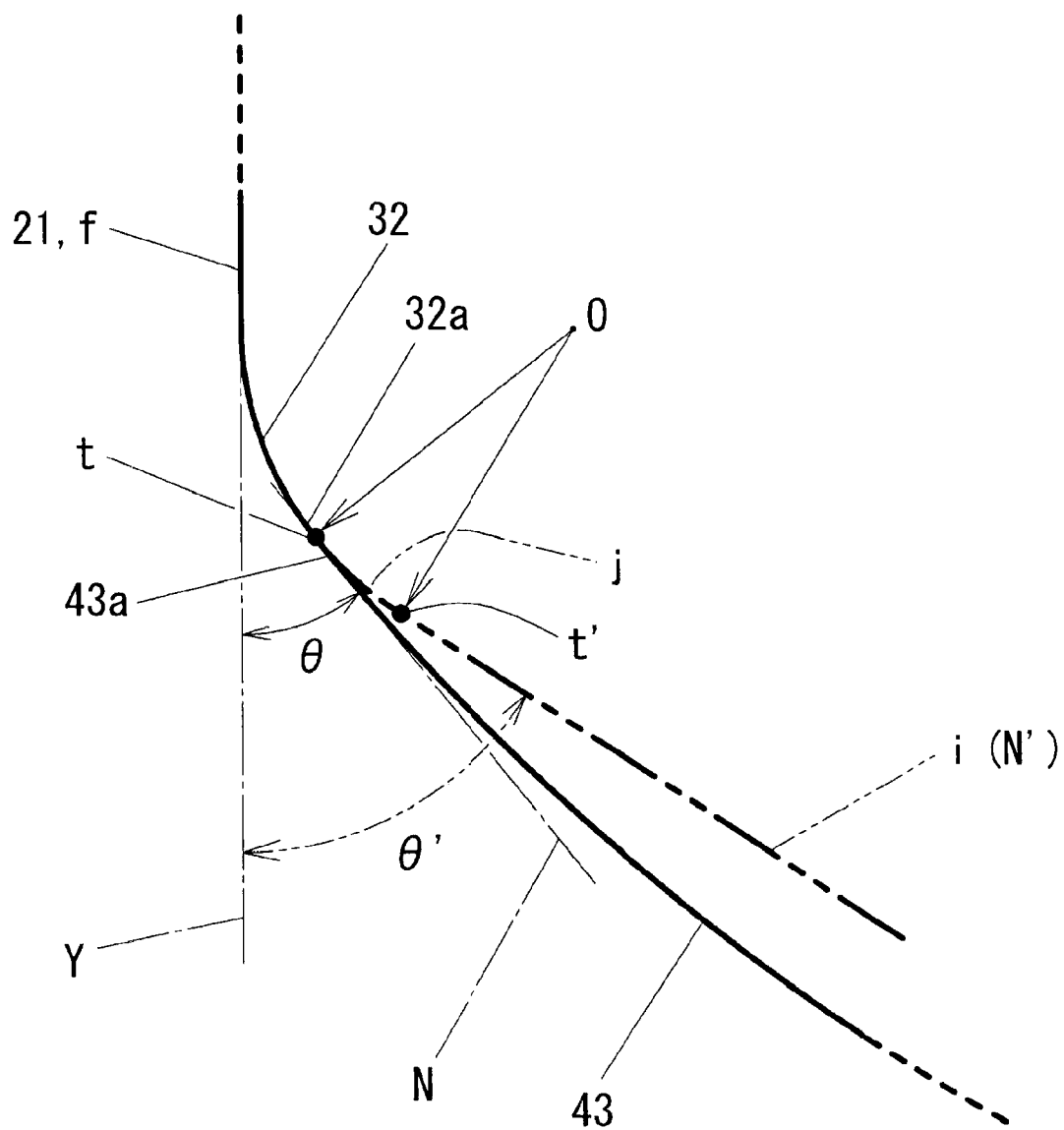
FIG. 3 is a schematic view illustrating a continuously formed manner of a hub surface rounded section with an inner and lower concave surrounding section.

In the structure of this example, because the inner lower concave surrounding section 43 has a shape that protrudes to the back side in the curved shape, an inclination angle θ, which rises to an imaginary plane Y orthogonal to the central axis L, of the inner peripheral edge 43a of the inner lower concave surrounding section 43 continuously formed with the outer peripheral edge 32a of the hub surface rounded section 32 can be made small. This is because the inner lower concave surrounding section 43 has a shape that protrudes to the back side in the curved shape as shown in FIG. 3, and therefore a contact region (contact point t) between the inner peripheral edge 43a and the outer peripheral edge 32a of the hub surface rounded section 32 is arranged in an inner side in the radial direction with respect to a contact region (contact point t') of the related art described below. The inclination angle θ of the inner peripheral edge 43a of the inner lower concave surrounding section 43 is an inclination angle θ of the following item (4) as described in detail with reference to FIG. 3.

(1) Center of curvature O of the hub surface rounded section 32.
(2) Contact point t between the outer peripheral edge 32a of the hub surface rounded section 32 and the inner peripheral edge 43a of the inner lower concave surrounding section 43.
(3) Normal line N derived from the center of curvature O described in the above item (1) and the contact point t described in the above item (2).
(4) Inclination angle θ between the normal line N described in the above item (3) and the hub mounting section 21 (the aforementioned imaginary plane Y).

Figure 6:
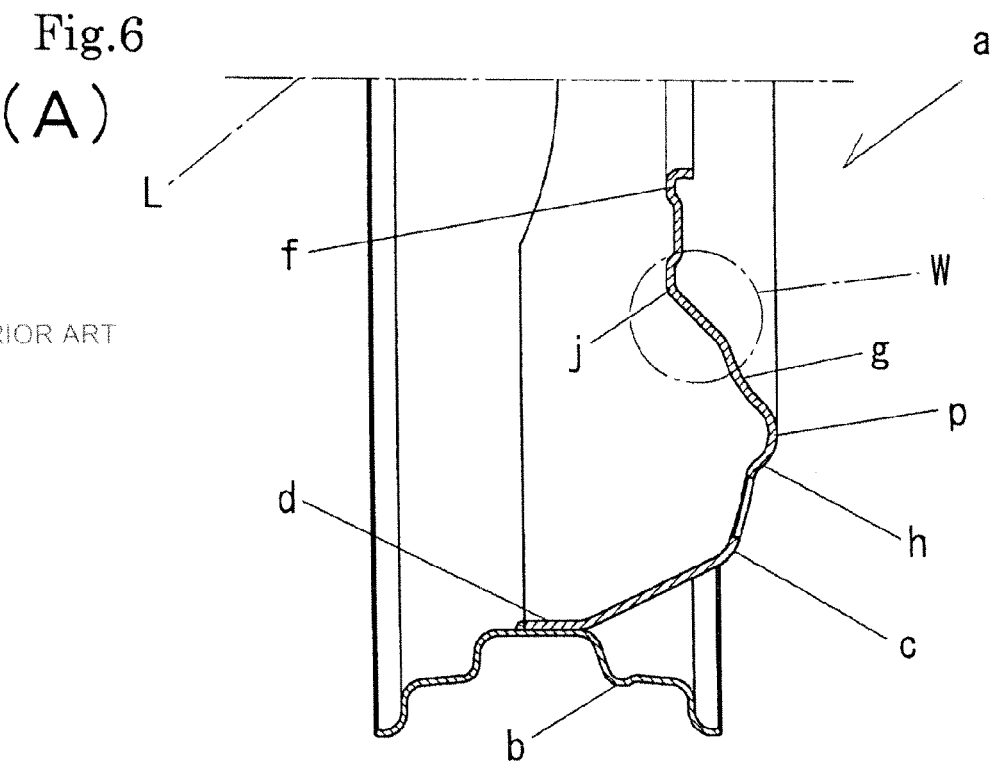
FIG. 6A is a vertical cross-sectional view of the automotive wheel a of related art structure.
FIG. 6B is an enlarged view of a part W of FIG. 6A.
Figure 6:
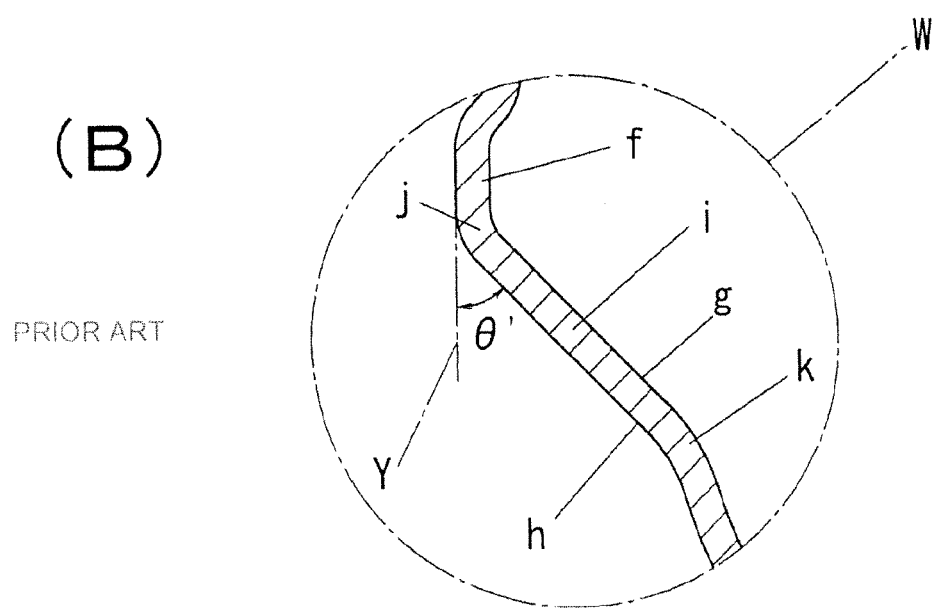

As the structure of the related art shown in FIG. 6 for example, when the hat inner inclined surrounding section g includes an inner lower inclined section i having a linear cross section and extending from the outer peripheral edge of the hub surface rounded section j to the inner peripheral edge of the inner convex surrounding section k, the inclination angle θ' of the inner lower inclined section i is determined consequentially depending on the positional relation with the hub mounting section f and the inner convex surrounding section k as described above. On the other hand, in the structure of this example, because the inner lower concave surrounding section 43 has a shape that protrudes to the back side in the curved shape, the inclination angle θ can be made smaller than the inclination angle θ' of the structure of the related art. The inclination angle θ' of the inner lower inclined section i is an inclination angle θ' of the following item (8) as described in detail with reference to FIG. 3.

(5) Center of curvature O of the hub surface rounded section j.
(6) Contact point t' between the outer peripheral edge of the hub surface rounded section j and the inner peripheral edge of the inner lower inclined section i.
(7) Normal line N' derived from the center of curvature O described in the above item (5) and the contact point t' described in the above item (6).

(8) Inclination angle θ' between the normal line N' described in the above item (7) and the hub mounting section f (the aforementioned imaginary plane Y).

Incidentally, in FIG. 3, the center of curvature O of the hub surface rounded section 32 according to this example is arranged to be the same as the center of curvature O of the hub surface rounded section j according to the related art, and the curvature of the hub surface rounded section 32 is determined to be the same as the curvature of the hub surface rounded section j.

Figure 4:
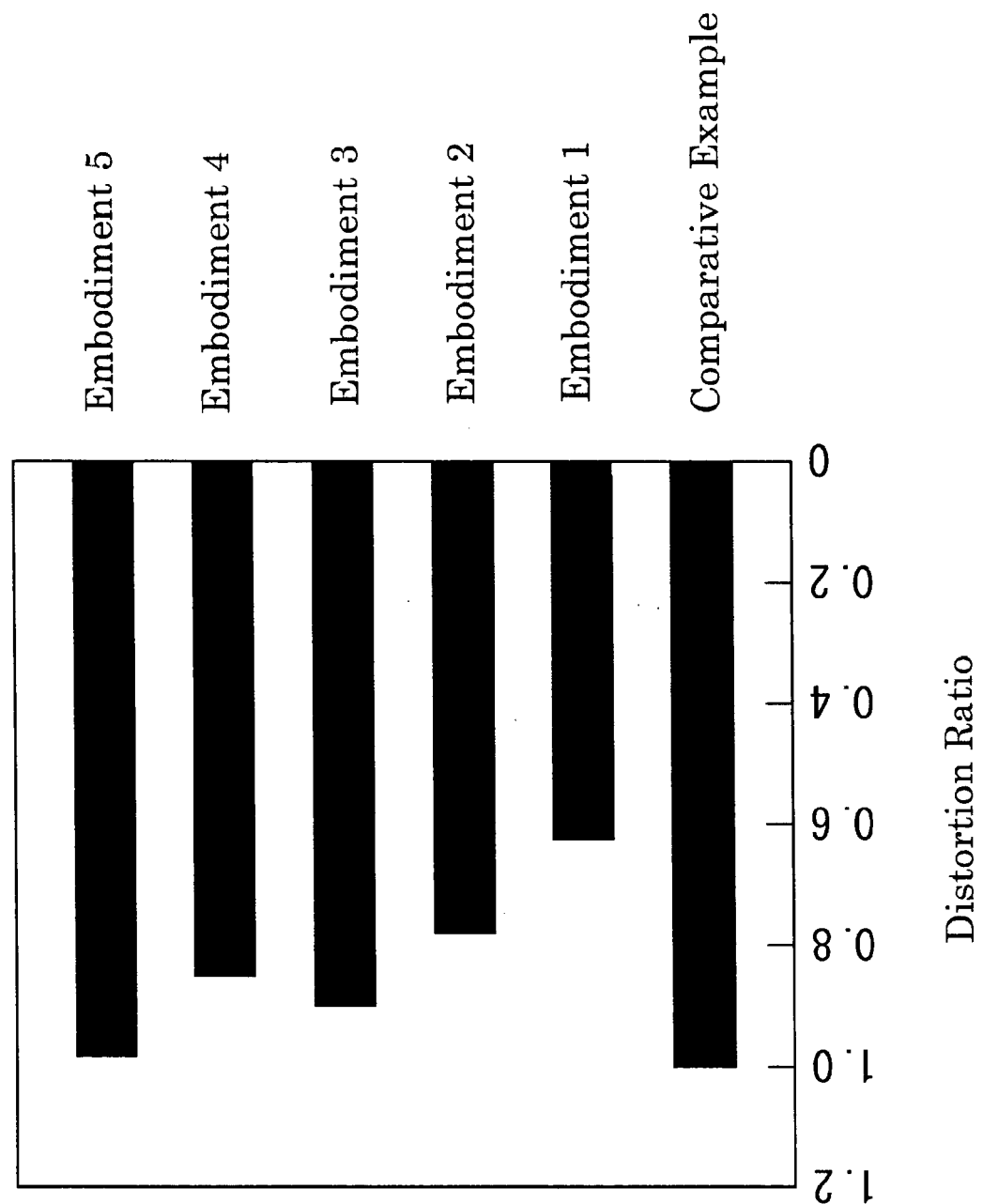
FIG. 4 is a chart showing the result of simulation calculation of stress that acts on the hub surface rounded section through a rotating bending endurance test of the automotive wheel 1 according to the present example.

The hub surface rounded section 32 has a strong tendency to become the origin of fracture through the rotating bending endurance test corresponding to the situation where the automobile is subjected to the lateral force as described above. Thus, by mitigating the stress concentration on the hub surface rounded section 32, the effect of improving the strength and the durability can be obtained. This example can reduce the inclination angle θ of the inner peripheral edge 43a of the inner lower concave surrounding section 43 and hence can reduce the burden of the stress on the hub surface rounded section 32 which is produced through the rotating bending endurance test. This is obvious from the result of a simulation calculation described later (see FIG. 4). According to the structure of this example, since the inclination angle θ of the inner peripheral edge 43a of the inner lower concave surrounding section 43 can be made smaller than the inclination angle θ' of the structure of the related art, the stress concentration on the hub surface rounded section 32 which is produced by the lateral force produced during the traveling of the automobile can be reduced. Therefore, the automotive wheel 1 can improve the strength and the durability against the lateral force in comparison with the related art.

In the structure of this example, the curvature of the inner lower concave surrounding section 43 is determined to be smaller than the curvature of the hub surface rounded section 32. When the radius of curvature of the inner lower concave surrounding section 43 is designated as R1 and the radius of curvature of the hub surface rounded section 32 is designated as R2, the relation between the both is given as R2<R1. Accordingly, the structure can be achieved such that the configurations of the inner lower concave surrounding section 43 and the hub surface rounded section 32 are well balanced and the both sections are continuously and smoothly formed. Therefore, significant effect of forming the inner lower concave surrounding section 43 so that the inclination angle θ is made small can be achieved, and the effect of reducing the burden of the stress on the hub surface rounded section 32 can be provided stably. Because the size that protrudes to the back side of the inner lower concave surrounding section 43 is restricted, the structure can be achieved such that the inner lower concave surrounding section 43 does not contact with the aforementioned brake caliper 105. Furthermore, in this example, when the radius of curvature of the inner convex surrounding section 41 is designated as R3, the relation with the radius of curvature of the inner lower concave surrounding section 43 and the radius of curvature of the hub surface rounded section 32 is given as R2<R3<R1. In other words, the configurations of these sections are determined so that the curvature of the inner lower concave surrounding section 43 is smaller than the respective curvatures of the hub surface rounded section 32 and the inner convex surrounding section 41. Accordingly, the structure can be achieved such that the configurations of the hub surface rounded section 32, the inner lower concave surrounding section 43, and the inner convex surrounding section 41 are well balanced and these sections are continuously and smoothly formed. Thus, the structure can be achieved such that the inclination angle θ of the inner peripheral edge 43a of the inner lower concave surrounding section 43 can be easily made small and the inner lower concave surrounding section 43 does not contact with the brake caliper 105.

Next, the result of the rotating bending endurance test (JIS D4103) of the automotive wheel 1 according to the aforementioned example which is performed through the simulation calculation with an FEM analysis method will be described.

In this example, specified input conditions such as boundary conditions and load conditions are set based on the rotating bending endurance test as per JIS D4103, the simulation calculation is performed by using the FEM analysis method, and then distortion occurred on the aforementioned hub surface rounded section 32 is calculated.

Figure 5:
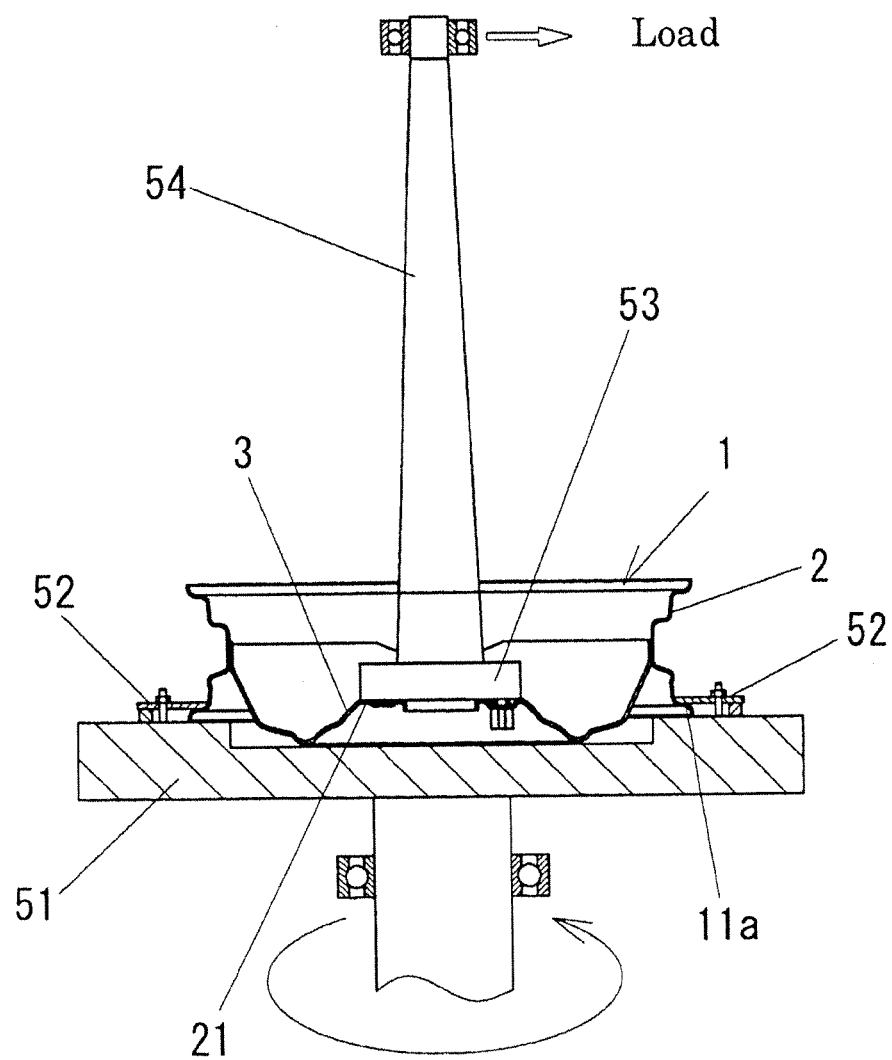
FIG. 5 is a schematic diagram illustrating a measurement method for the rotating bending endurance test.

For the rotating bending endurance test as per JIS D4103, as shown in FIG. 5, the hub mounting surface 21 of the automotive wheel 1 rotating at a constant speed is subjected to a constant bending moment and rotated up to the specified number of rotations that is determined in advance, and then the presence of anomaly is checked. Or, the wheel is rotated until the fracture such as a crack occurs, and the number of rotations at which the fracture occurs is determined. Specifically, the surface-side rim flange 11a of the automotive wheel 1 is secured to an upper surface of a rotating disc 51 with a clamp 52. A mounting disc 53 disposed in one end of a load arm 54 is connected to the hub mounting section 21 from the back side of the automotive wheel 1, and therefore the load arm 54 is mounted on the automotive wheel 1. After the automotive wheel 1 is set as described above, a load is applied on the other end of the load arm 54 along the horizontal direction, and while the bending moment is applied on the wheel disc 3, the rotating disc 51 is rotated at a constant speed. The presence of the fracture within the specified number of rotations or the number of rotations at which the fracture occurs is used as an index of the durability.

In this example, the aforementioned rotating bending endurance test is simulated with the FEM analysis method, and the distortion occurred on the hub surface rounded section 32 is calculated. The inventors of the present invention have found as a result of a number of the rotating bending endurance tests on the two-piece type steel wheel such as this example that the fracture easily occurs on the hub surface rounded section. In addition, the inventors have found that the distortion occurred on the hub surface rounded section is large according to the simulation calculation of the rotating bending endurance test with the FEM analysis method, and the simulation calculation agrees with the test result described above. According to the above findings, it can be realized that if the distortion occurred on the hub surface rounded section can be reduced through the aforementioned simulation calculation, high durability can be provided in the rotating bending endurance test.

For the automotive wheel 1 according to this example used in the simulation calculation, a 17-inch steel wheel is conceived. In addition, the following parameters are given: the outer diameter of the wheel disc 3 is 395.6 mm, the outer diameter of the hub mounting section 21 is 147 mm, the diameter of the hat top surrounding section 36 is 255 mm, the diameter of the inner convex surrounding section 41 of the hat inner inclined surrounding section 35 is 188 mm, and the inset is 45 mm. For the five types of structures in which the radius of curvature R1 of the inner lower concave surrounding section 43 is given as R1=25 mm (Embodiment 1), 50 mm (Embodiment 2), 100 mm (Embodiment 3), 200 mm (Embodiment 4), and 250 mm (Embodiment 5), the simulation calculation based on the rotating bending endurance test is performed to determine the distortion occurred on the hub surface rounded section 32.

The automotive wheel 1 according to the examples labeled Embodiments 1 through 5 exhibits the tendency in which the inclination angle θ of the inner peripheral edge 43a of the inner lower concave surrounding section 43 decreases as the radius of curvature R1 of the inner lower concave surrounding section 43 decreases (see FIG. 3). In the case of Embodiment 4 in which the radius of curvature R1 of the inner lower concave surrounding section 43 is equal to 200 mm, the radius of curvature R2 of the hub surface rounded section 32 is equal to 4 mm, the radius of curvature R3 of the inner convex surrounding section 41 is equal to 18 mm, and the relation is given as R2<R3<R1. Similarly, in the structure according to the examples labeled Embodiments 1 through 5 described above, because the radius of curvature R1 of the inner lower concave surrounding section 43 is within a range of 25 mm to 200 mm, the relation of R2<R3<R1 is maintained. In other words, the following relation can be maintained.

Curvature of inner lower concave surrounding section 43<Curvature of inner convex surrounding section 41<Curvature of hub surface rounded section 32

As a comparative example, for the aforementioned conventional automotive wheel a shown in FIG. 6, the similar simulation calculation is performed to determine the distortion occurred on the hub surface rounded section j. The examples labeled Embodiments 1 through 5 and the comparative example have the same geometries except that the geometries of the areas from the hub surface rounded section to the inner convex surrounding section (the inner lower concave surrounding section or the inner lower inclined section) are different.

The result of the simulation calculation described above is shown in FIG. 4. In this calculation result, the distortions occurred on the hub surface rounded section 32 in the respective examples are shown with ratios relative to the distortion occurred on the hub surface rounded section j in the comparative example. As a result, the tendency is exhibited such that the distortions occurred on the hub surface rounded section 32 are reduced as the radius of curvature R1 of the inner lower concave surrounding section 43 decreases (or the curvature increases). It is considered that this is because the burden of the stress on the hub surface rounded section 32 can be reduced. As described above, the inclination angle θ of the inner peripheral edge 43a of the inner lower concave surrounding section 43 decreases as the radius of curvature of the inner lower concave surrounding section 43 decreases. Therefore, it is considered that the stress concentration on the hub surface rounded section 32 can be reduced through the decrease of the inclination angle θ of the inner peripheral edge 43a of the inner lower concave surrounding section 43.

It is also realized that the distortion is sufficiently small relative to the comparative example within the range where the radius of curvature R1 according to the examples labeled Embodiments 1 through 4 is 25 mm or greater and 200 mm or smaller, and a high advantage can be provided. On the other hand, in the case where the radius of curvature R1=250 mm according to Example 5, the advantage is smaller than the comparative example. According to the simulation calculation, when the structure is made such that the radius of curvature R1 of the inner lower concave surrounding section 43 is 200 mm or smaller, high durability (strength) can be provided in the rotating bending endurance test relative to the related art (comparative example).

On the other hand, as the radius of curvature R1 of the inner lower concave surrounding section 43 decreases, the protrusion of the inner lower concave surrounding section 43 to the back side becomes large. As the protrusion becomes large, a concern rises that the inner lower concave surrounding section 43 contacts with the brake caliper 105. In consideration of the above, the radius of curvature R1 of the inner lower concave surrounding section 43 is determined to be 25 mm or greater so that noncontact of the inner lower concave surrounding section 43 with the brake caliper 105 can be maintained.

According to the above findings, the automotive wheel 1 according to this example is specified that the radius of curvature R1 of the inner lower concave surrounding section 43 continuously formed with the outer peripheral edge of the hub surface rounded section 32 is given within the range of 25 mm or greater and 200 mm or smaller. Accordingly, the inclination angle θ of the inner peripheral edge 43a of the inner lower concave surrounding section 43 can be made small, and hence the burden of the stress on the hub surface rounded section 32 through the rotating bending endurance test can be reduced. Therefore, the stress concentration on the hub surface rounded section 32 which is produced by the lateral force applied during the traveling of the automobile can be reduced, and the strength and the durability of the automotive wheel 1 can be improved in general. In addition, the inner lower concave surrounding section 43 does not contact with the brake caliper 105, and the noncontact of the wheel disc 3 of the automotive wheel 1 with the brake caliper 105 can be maintained.

In the examples described above, the result of the simulation calculation of the rotating bending endurance test for the wheels in which the geometries are specified by using the 17-inch automotive wheel 1 has been disclosed; however, the same result and tendency can be obtained for the structure that has a different wheel size or a different geometry. Thus, the structure having the other size can also achieve the same functional effect as described above.

The present invention is not limited to the examples discussed above, and may be modified appropriately within the scope and spirit of the present invention. For example, the automotive wheel formed from aluminum alloy, magnesium alloy, titanium alloy or fiber reinforced metal (FRM) and having the same structure can also achieve the same functional effect.

What is claimed is:

1. An automotive wheel having a wheel disc comprising:
  a generally disc-shaped hub mounting section connected to a hub of an axle,
  a hub surface rounded section continuously formed with an outer peripheral edge of the hub mounting section and convexly curved in a back side, and
  a hat section continuously formed with an outer peripheral edge of the hub surface rounded section and protruding to a surface side, the hat section being joined with a generally cylindrical wheel rim on which a tire is mounted,
  wherein the hat section comprises:
  a hat top surrounding section protruding to the surface side in a curved shape over a circumferential direction; and
  a hat inner inclined surrounding section continuously formed with an inner peripheral edge of the hat top surrounding section and continuously formed with the outer peripheral edge of the hub surface rounded section, and
  wherein the hat inner inclined surrounding section comprises:

an inner convex surrounding section protruding to the surface side in a curved shape; and an inner lower concave surrounding section continuously formed with an inner peripheral edge of the inner convex surrounding section, continuously formed with the outer peripheral edge of the hub surface rounded section, and protruding to the back side in a curved shape.

2. The automotive wheel according to claim 1, wherein the inner lower concave surrounding section is formed such that curvature thereof is smaller than curvature of the hub surface rounded section.

3. The automotive wheel according to claim 1, wherein the inner lower concave surrounding section, the inner convex surrounding section, and the hub surface rounded section are respectively formed to have the following relation:

Curvature of inner lower concave surrounding section<Curvature of inner convex surrounding section<Curvature of hub surface rounded section.

4. The automotive wheel according to claim 1, wherein the inner lower concave surrounding section has the radius of curvature of 25 mm or greater and 200 mm or smaller.

\* \* \* \* \*